United States Patent

[11] 3,614,482

[72] Inventors Antonin Glanc
Libochovice;
Vaclav Janovec, Praha, both of
Czechoslovakia
[21] Appl. No. 4,288
[22] Filed Jan. 20, 1970
[45] Patented Oct. 19, 1971
[73] Assignee Ceskoslovenska akademie ved
Praha, Czechoslovakia

[54] DC VOLTAGE INVERTER
14 Claims, 3 Drawing Figs.
[52] U.S. Cl. .................................................. 310/8.1,
310/9.8, 317/247, 317/258, 317/259, 323/94,
330/7, 331/116, 331/154, 331/163
[51] Int. Cl. .................................................. H01v 7/00
[50] Field of Search ........................................ 310/8.0,
8.1, 9.8; 323/94; 317/231, 258, 259, 247, 262;
331/154, 163; 330/7

[56] References Cited
UNITED STATES PATENTS

| | | | |
|---|---|---|---|
| 2,795,648 | 6/1957 | Mason........................... | 330/7 X |
| 2,810,023 | 10/1957 | Hollmann...................... | 330/7 X |
| 2,848,563 | 8/1958 | Scorgie......................... | 330/7 X |
| 2,922,959 | 1/1960 | Holloway ..................... | 330/7 X |
| 3,032,706 | 5/1962 | Wieder.......................... | 323/94 |
| 3,101,452 | 8/1963 | Holcomb et al. ............. | 330/7 X |
| 3,257,607 | 6/1966 | Pintell .......................... | 317/247 X |
| 3,355,634 | 11/1967 | Glanc............................ | 317/258 X |
| 3,432,773 | 3/1969 | Land et al..................... | 331/116 |

*Primary Examiner*—Milton O. Hirshfield
*Assistant Examiner*—Mark O. Budd
*Attorneys*—Richard Low and Murray Schaffer

ABSTRACT: A capacitor operating at a temperature-autostabilized state, having a pair of exciting electrodes and a ferroelectric dielectric arranged therebetween. An AC generator is connected between the paired electrodes. The capacitor has output electrodes arranged in association with the first paired electrodes, and surrounded at least in part by one of them and an AC amplifier.

INVENTORS
ANTONIN GLANC
VACLAV JANOVEC
BY
ATTORNEY 3,614,482

DC VOLTAGE INVERTER

BACKGROUND OF INVENTION

The present invention relates to contactless inverters and in particular to apparatus and method for converting DC voltages into corresponding AC voltages.

Inversion apparatus are commonly employed with AC amplifiers to detect and measure DC sources, particularly of very low voltage. Because the inverting mechanism is the most delicate and sensitive portion of such apparatus it is important that it be accurate and consistent.

Existing contactless inverters have many drawbacks and disadvantages. For example, their input resistance is not sufficiently high; they are temperature dependent, varying in input and consistency with changes in temperature; and require direct galvanic coupling between the input DC circuit and the circuit of the resultant output, reducing the sensitivity of the apparatus, increasing the zero drift across the output and affect the input circuit to be measured.

It is an object of this invention to provide inverter apparatus which is free of the mentioned drawbacks and disadvantages.

It is another object of this invention to provide inverter apparatus which is highly sensitive, easily produced, and easily employed over wide ranges of input voltage.

It is another object of this invention to provide inverter apparatus which is free of temperature dependence and whose output is constant notwithstanding changes in ambient temperature.

It is still a further object to provide inverter apparatus which is easily adjustable for variable operating conditions.

These and other objects and advantages will be seen from the description of the present invention contained herein.

SUMMARY OF INVENTION

According to the present invention there is provided apparatus and a method derived in association therewith for transforming a DC voltage into an AC voltage. Briefly the apparatus comprises a capacitor having a pair of exciting electrodes and a ferroelectric dielectric arranged therebetween, an AC generator connected between the paired electrodes, output electrodes arranged in association with the first paired electrodes, and surrounded at least in part by one of them and an AC amplifier. When an AC voltage of given frequency is impressed on the paired electrodes the capacitor resonates mechanically so that when a DC voltage is applied across the output electrodes an AC output is delivered to the amplifier in proportion thereto and temperature autostabilized.

In the preferred form the AC generator is adjustable, and a second DC source for biasing the applied DC is provided.

Also the paired electrodes has one electrode of ring shape and has located in its center one of the electrodes of the output.

The invention will be described in greater detail in the following description in which reference is made to the accompanying drawings.

DESCRIPTION OF INVENTION

The present invention makes use of techniques disclosed in the inventor's U.S. Pat. No. 3,355,634 issued Nov. 28, 1967. In that patent there is disclosed a capacitor and/or sensing device employing a ferroelectric dielectric which is temperature autostabilized. To avoid a lengthy disclosure here of redundant and repetitious material, that patent is referenced herein as if it were more fully set forth.

Figure 1:
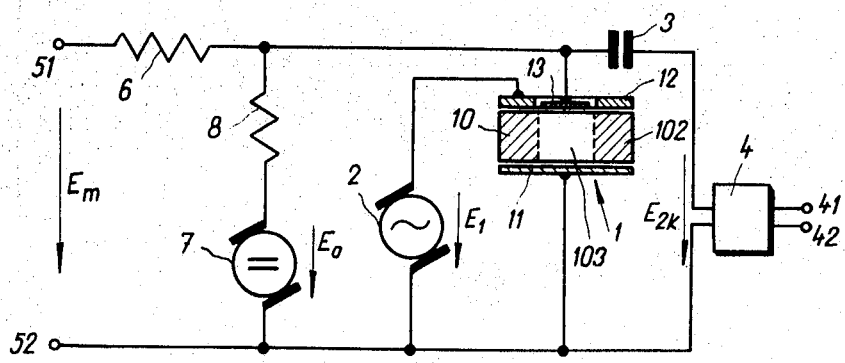
FIG. 1 is a mechanical-electrical schematic illustration of inverter apparatus in accordance with the present invention, FIG. 2. is a graph illustrating the shift of resonance peaks as a function of temperature.

Turning now to FIG. 1 the present apparatus comprises an inverter generally depicted by the numeral 1 formed of a dielectric 10 preferably made in disk shape of a single crystal of triglycine sulfate, although other shapes and materials may be used. The dielectric 10 is provided on its lower face with a common electrode 11 and on its upper face with an excitor electrode 12 of ring or annular shape. Both electrodes are radially coextensive with disk 10. Within the center of excitor electrode 12 and spaced therefrom is located an output electrode 13.

The electrodes 11 and 12 are respectively connected to the terminals of an AC generator 2 providing a source of alternating current having a voltage E, and a frequency $f$ (FIG. 2). 2). The electrode 13 is adapted to be connected to one terminal 51 of the applied or detected source of direct current having a voltage $E_m$, via a choke or blocking resistor 6. The common electrode 11 is also connected to the second terminal 52 of the applied DC source.

The output electrode 13 is connected simultaneously through a coupling capacitor 3, or suitable low-pass filter, to the first terminal of the input end of an amplifier 4, which is also connected to the second terminal 52 of the applied input DC source, in common with electrode 11. The amplifier 4 is provided with a pair of output terminals 41 and 42 for connection to the AC circuit.

Figure 3:
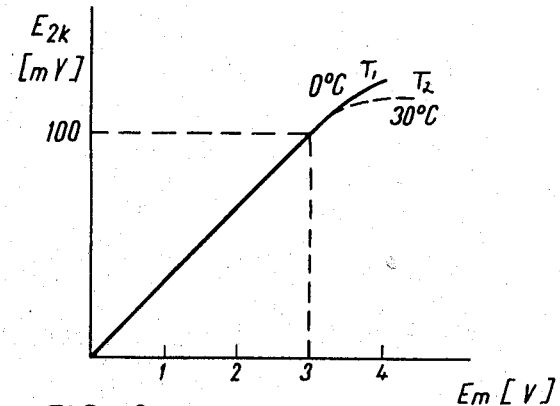
FIG. 3 illustrates the operation of the apparatus of the present invention.

Located across the output electrode 13 and the common electrode 11 is an adjustable or variable biasing source of DC voltage $E_o$ and a series connected choke resistor 8 suppressing any undesired polarization of the dielectric material 10 and which when provided with opposed polarization may be used to bias and adjust the working point (i.e., relationship between $E_m$ and $E_{2k}$) the apparatus by preventing shifting of the curve shown in FIG. 3.

Operatively, the AC generator 2 supplies a voltage $E_1$ through the dielectric 10 creating a mechanical resonance therein between the exciter electrode 12 and the common electrode 11 resulting in the piezoelectric creation of an induced voltage across the output electrode 13 and the common electrode 11. Simultaneously, if a voltage is passed from the input source $E_m$ the capacitor produces across the amplifier an AC voltage $E_{2k}$ of the desired magnitude proportional to the input $E_m$.

Since the electrode 12 is ring shaped the "heating region" or region of dielectric loss lies coaxially about the periphery of the dielectric 10 as indicated by the shaded portion 102. This region is brought into a temperature-autostabilized state in accordance with the teachings of the aforementioned patent.

The axially central region, unshaded and denoted by the numeral 103 in FIG. 1, lies axially with respect t the output electrode and constitutes the output region making use of the piezoelectric effect of the material. This output region is effected by the mechanical vibration of the dielectric and by the surrounding "heating region" and is raised in temperature to the neighborhood of the phase transition of the ferroelectric material and is maintained at that temperature during constant operating conditions. In this transition thermal region the piezoelectric coefficient ($d$) depends upon or responds directly to the voltage $E_m$.

In accordance with the present invention, when the exciting voltage $E_1$ is maintained constant, the AC output $E_{2k}$ has a magnitude directly proportional to the magnitude of the applied DC voltage $E_m$ and a frequency which equals the second harmonic of the exciting frequency $f$. If the ambient temperature varies, the resonant peaks of the AC output voltage $E_{2k}$ shifts in a direction dependent upon the value of the frequency $f$. That is the peaks at the low frequencies shift in one direction while the peaks at the higher frequencies shift in the opposite direction. There is a certain critical frequency at which notwithstanding the change in temperature virtually no shift occurs.

Figure 2:
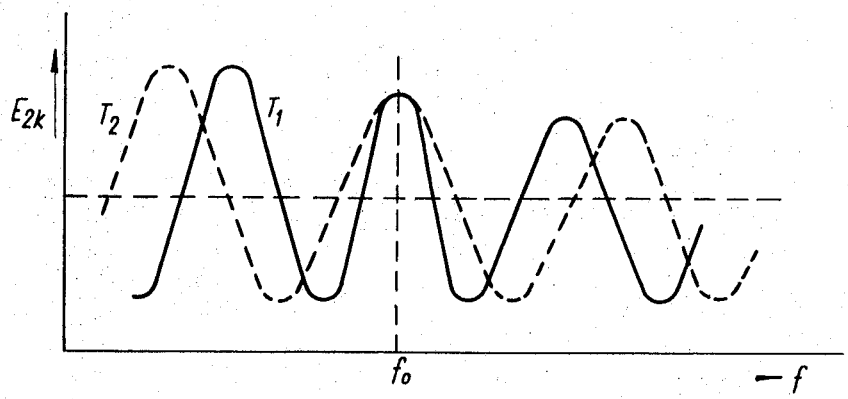

The above is illustrated in FIG. 2 wherein the horizontal line $f$ represents the exciting frequencies, the vertical line represents the output AC voltage $E_{2k}$ and the dotted and full lines represent temperature dependent outputs $T_1$ and $T_2$ respectively. It will be seen that at a frequency $F_o$ the curves of both $T_1$ and $T_2$ coincide establishing a critical frequency at which no matter what the variation the ambient temperature takes there is no shift in the output AC voltage $E_{2k}$. Consequently if the exciting frequency $f$ is chosen as close as possible to this critical frequency $f_o$ the inverted or output voltage $E_{2k}$ becomes highly stabilized and virtually independent of temperature variation.

This desirable condition can be easily obtained by employing the combination of adjustable biasing DC source 7 and the adjustable exciting or heating source 2. This is illustrated in FIG. 3 for an actual inverter employing a triglycine sulfate dielectric. The horizontal line represents the DC applied voltage $E_m$ and the vertical line represents the AC output voltage $E_{2k}$. To obtain the desired-operating situation the biasing voltage $E_o$ is adjusted so that for a predetermined input voltage $E_m$ the AC output voltage $E_{2k}$ is equal to 0 (zero). The frequency $f$ of the exciting voltage $E_1$ was then adjusted to be as close as possible to the desired critical frequency $f_o$ rendering it virtually independent of ambient temperature. As a result the curves $T_1$ and $T_2$ corresponding to ambient temperatures $0°$ C. and $30°$ C. respectively are both linear and coincident over the entire operating area.

It will thus be seen that the present invention provides DC inversion apparatus free of temperature sensitivity, providing a constant stable output. It will also be seen that the present apparatus is adjustable and operable over a wide range of operating conditions, so that it may be made sensitive to very low DC voltages.

A number of modifications have been mentioned herein. Others will be obvious to those skilled in this art. For example the common electrode 11 may be divided into two portions corresponding directly to the excitor electrode 12 and the output electrode 13. The ring electrode 12 may be modified to have merely an arcuate shape or be a split ring, the object being that the electrode, at least partially, surrounds the output electrode. The changes and modifications suggested in the aforementioned patent may also be made here. Accordingly it is intended that this description be taken as illustrative only of the present invention and not as limiting thereof.

What is claimed:

1. Inverter apparatus for transforming a DC voltage comprising a capacitor having a pair of exciting electrodes and a ferroelectric dielectric arranged therebetween, an AC generator connected between said paired electrodes establishing an exciting region between said electrodes, output electrodes arranged in association with said paired electrodes and surrounded at least in part by said exciting region forming an output region, means for applying a DC voltage to said output electrodes, and means for producing piezoelectrically at said output region an AC voltage maintained in a temperature autostabilized state in the phase transition region of the dielectric.

2. The inverter according to claim 1 wherein one of said paired electrodes and one of said output electrodes are commonly formed.

3. The inverter according to claim 2 wherein the other one of said paired electrodes is ring shaped and the other one of said output electrodes is located within the center thereof.

4. The inverter according to claim 3 including a source of DC voltage and a blocking resistor located between one terminal thereof and the other of said output electrodes.

5. The inverter according to claim 1 wherein said AC generator is adjustable to vary the frequency of its voltage.

6. The inverter according to claim 1 including a coupling capacitor associated with said amplifier.

7. The inverter according to claim 4 including a second source of DC voltage connected across the first source to bias the same.

8. The inverter according to claim 7 wherein said second DC voltage is adjustable.

9. The inverter according to claim 1 wherein one of said paired electrodes and one of said output electrodes are commonly formed, said commonly formed electrodes, one terminal of said AC generator and one terminal of said AC amplifier being commonly connected one terminal of said means for applying the DC current.

10. The inverter according to claim 5 including means for adjusting said AC generator ro produce a frequency in the region of minimum resonance peak shift as a function of temperature.

11. The method of transforming a DC voltage into an AC voltage employing inverter apparatus comprising a capacitor having a pair of exciting electrodes and a ferroelectric dielectric arranged therebetween, an AC generator connected between said paired electrodes, output electrodes arranged in association with said paired electrodes, output paired electrodes and surrounded at least in part by one of them and an AC amplifier said method comprising the steps of creating an exciting region between said paired electrodes, impressing an AC voltage thereon, and applying a DC voltage to said output electrodes and producing piezoelectrically at said output electrodes an AC voltage proportional to said applied voltage in a temperature-autostabilized state.

12. The method according to claim 10 wherein said impressed AC voltage is varied to provide a voltage having a selected frequency in the region of minimum resonance peak shift as a function of temperature.

13. The method according to claim 12 including applying a biasing DC voltage of opposed polarization across the first applied DC voltage.

14. The inverter according to claim 1 including an AC amplifier connected to said output electrodes.